June 23, 1925. 1,543,485

C. REINEKE

ENGINE

Original Filed May 24, 1921 7 Sheets-Sheet 1

Inventor
Charles Reineke,
By Wm E. Dyre.
Attorney

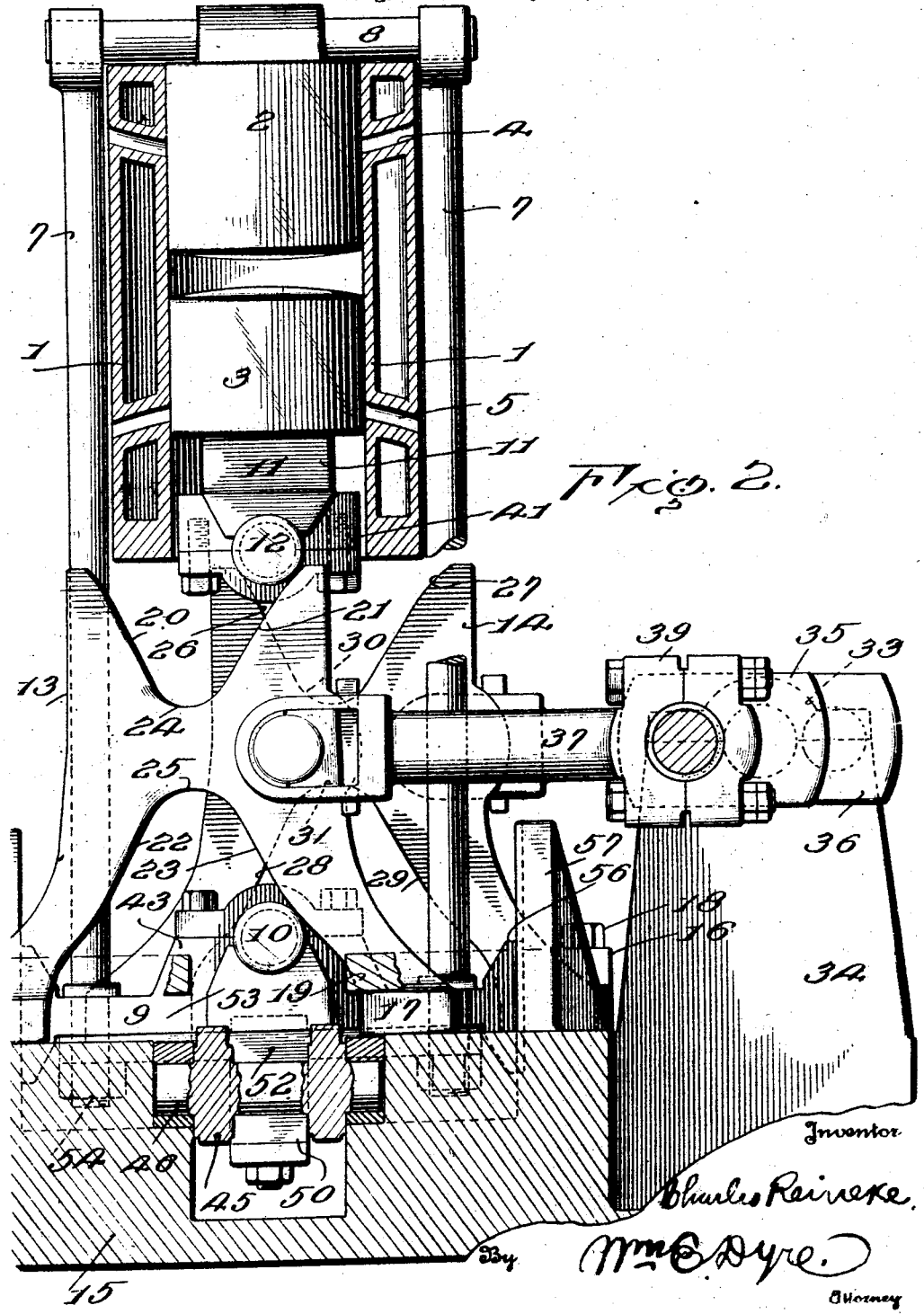

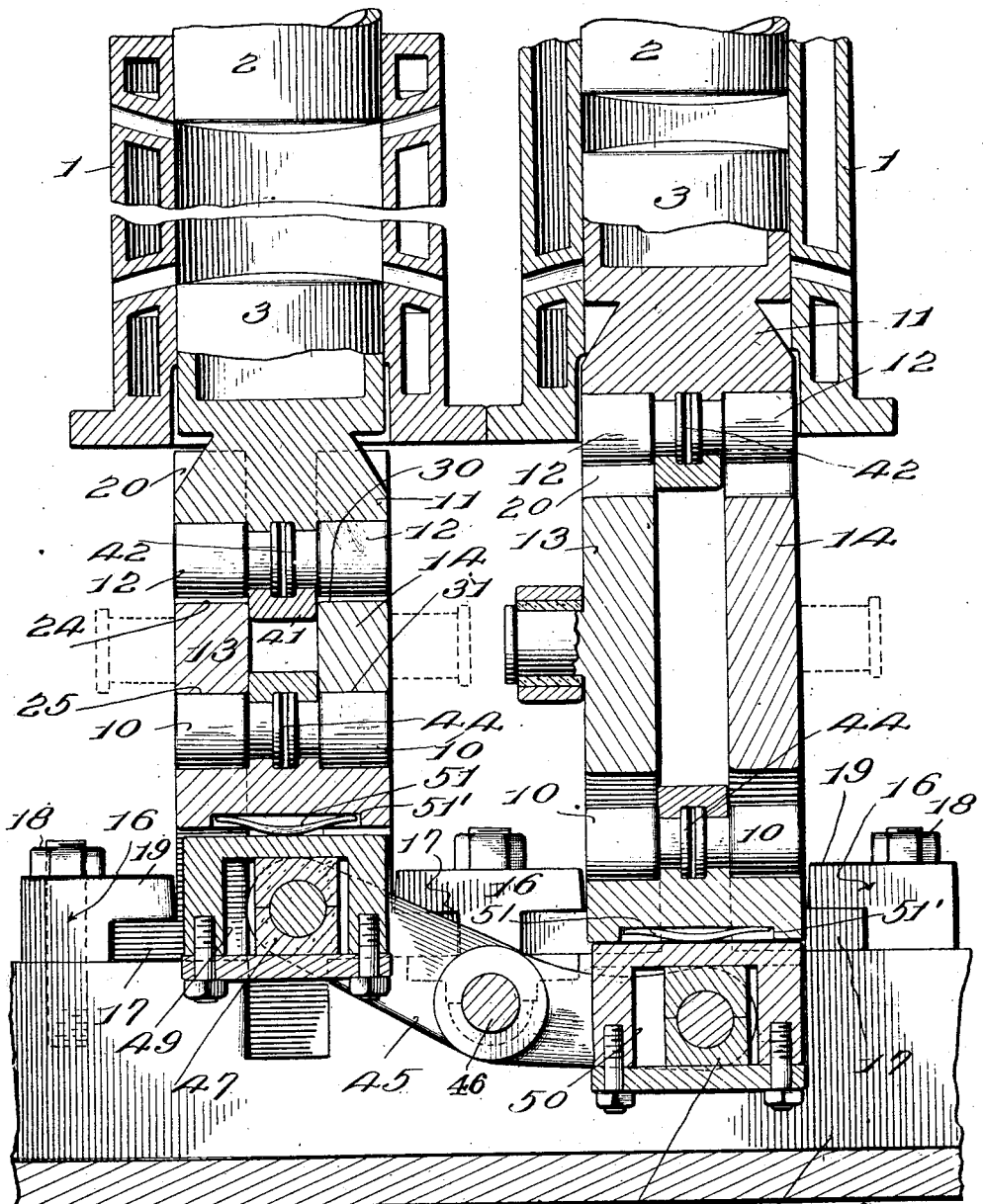

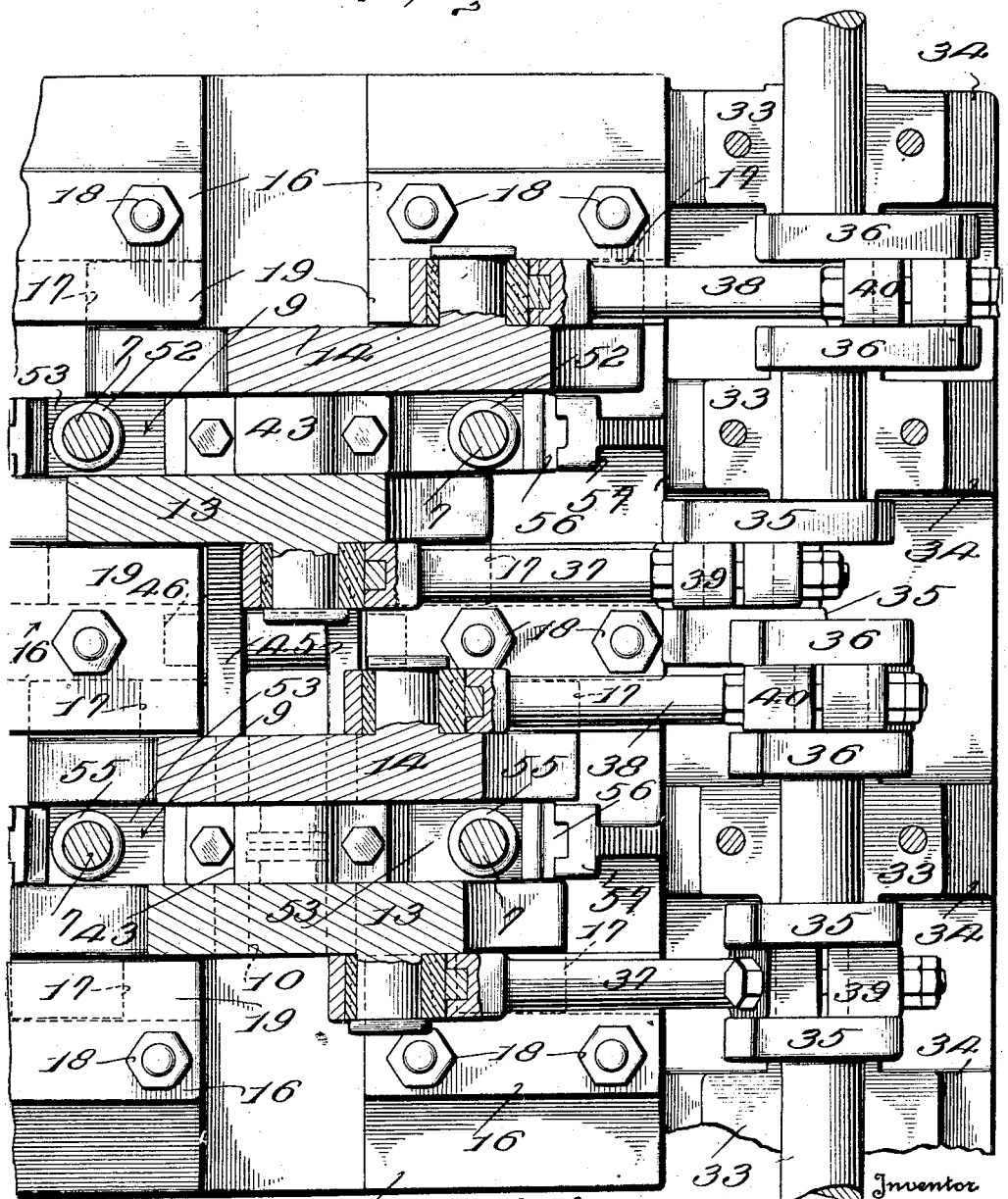

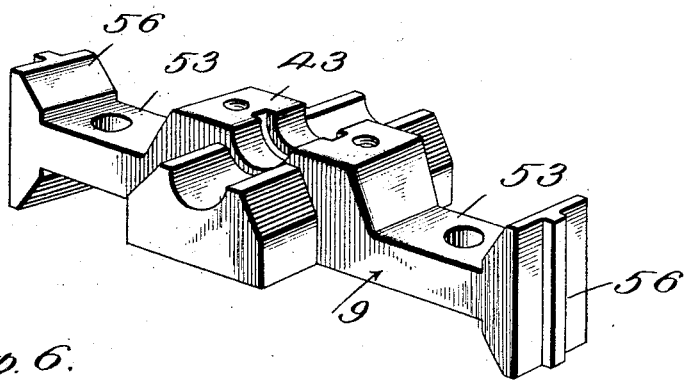
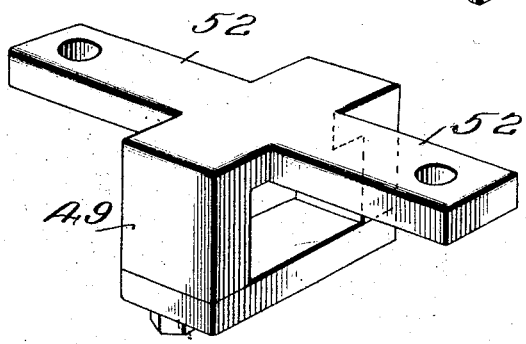
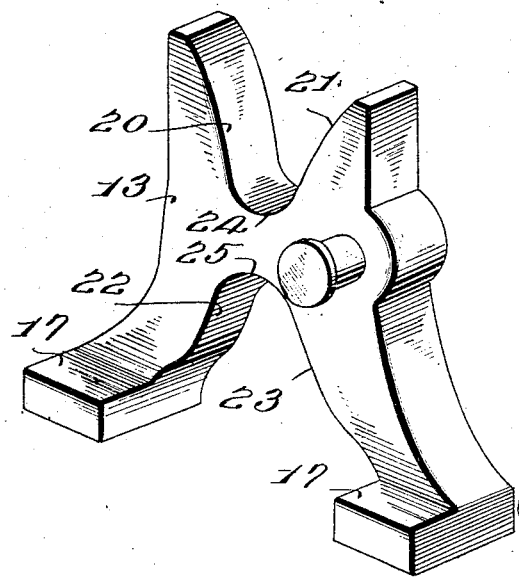

June 23, 1925.  1,543,485
C. REINEKE
ENGINE
Original Filed May 24, 1921   7 Sheets-Sheet 6
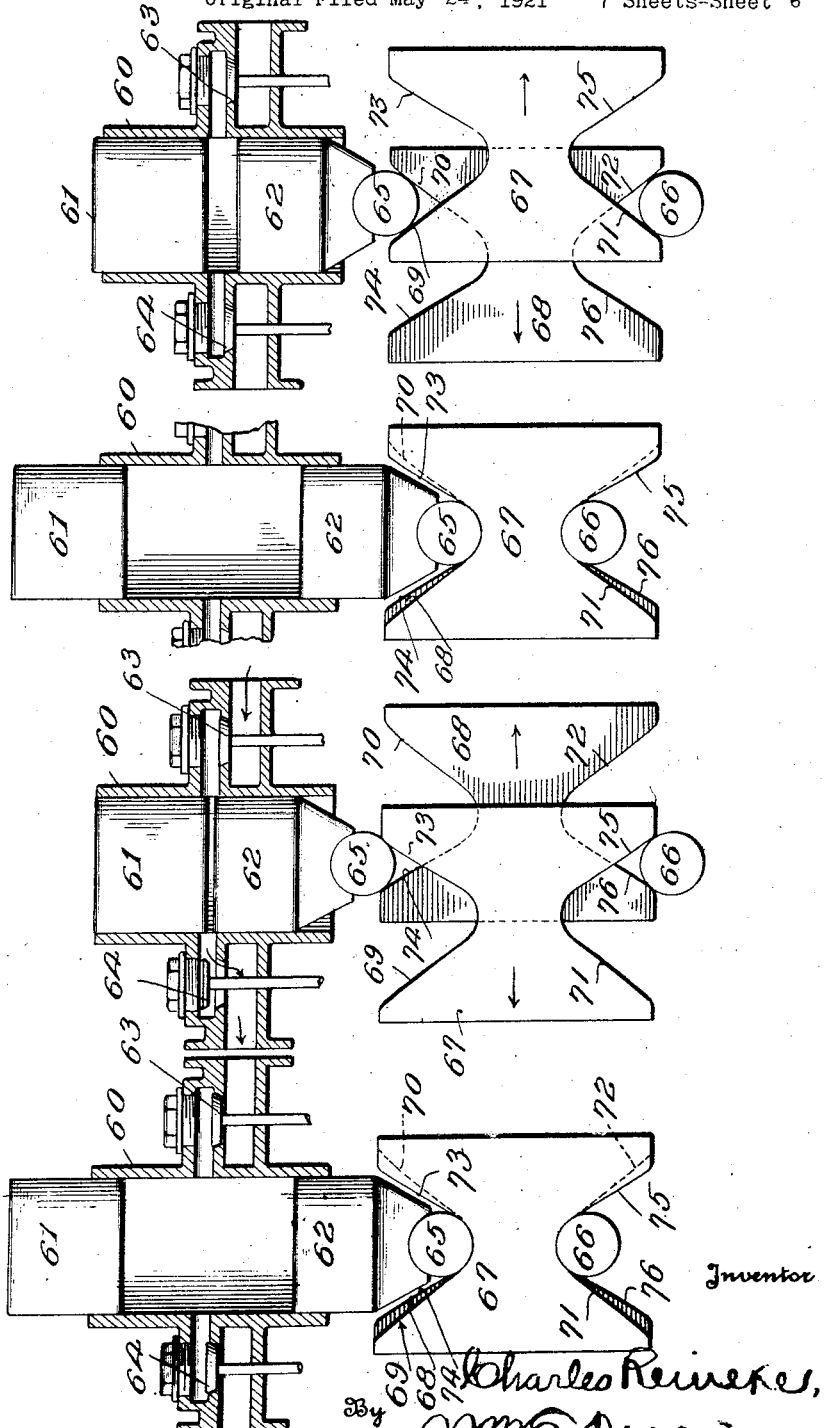
Inventor
Charles Reineke,
By Wm. E. Dyre
Attorney June 23, 1925.  1,543,485
C. REINEKE
ENGINE
Original Filed May 24, 1921   7 Sheets-Sheet 7
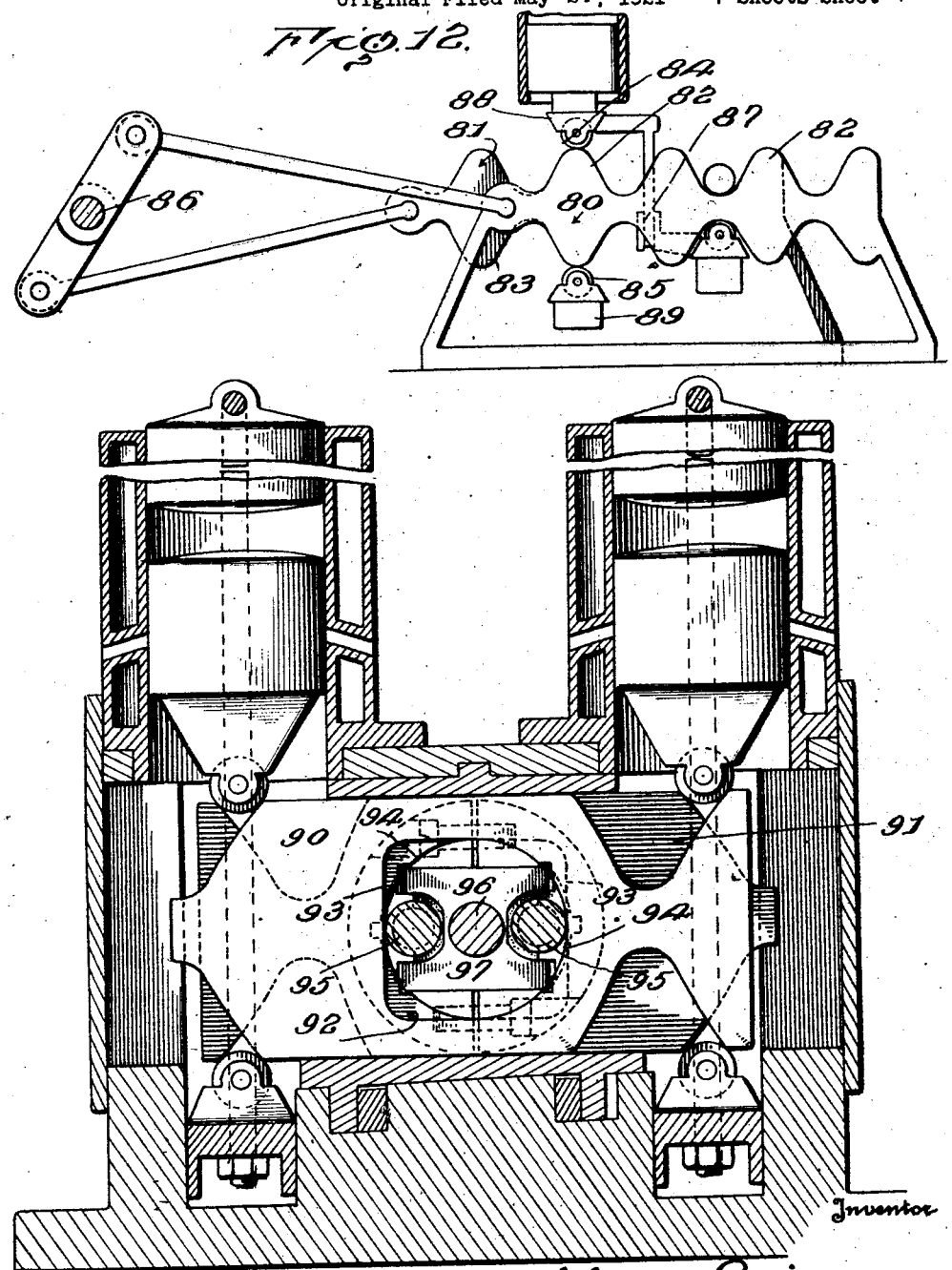
Inventor
Charles Reineke,
By Wm. E. Dyre.
Attorney Patented June 23, 1925.

1,543,485

UNITED STATES PATENT OFFICE.

CHARLES REINEKE, OF NEW YORK, N. Y., ASSIGNOR TO THE REINEKE MOTOR CORPORATION, OF NEW YORK, N. Y., A CORPORATION OF DELAWARE.

ENGINE.

Application filed May 24, 1921, Serial No. 472,192. Renewed March 12, 1925.

*To all whom it may concern:*

Be it known that I, CHARLES REINEKE, a citizen of the United States, residing at New York, in the county of New York and State of New York, have invented certain new and useful Improvements in Engines; and I do hereby declare the following to be a full, clear, and exact description of the invention, such as will enable others skilled in the art to which it appertains to make and use the same.

This invention relates primarily to engines, and more particularly stated contemplates the production of means for transmitting a multiplicity of relatively high speed piston strokes to a slower moving power shaft.

At present it is customary to effect the slow rotation of a power shaft driven from a high speed engine shaft by interposing various forms of reduction devices commonly known as reduction gearing. The usual construction of engine, whether of the internal combustion, turbine or other type, has been universally maintained and the particular form of reduction mechanism has been associated with the engine shaft and the power shaft to permit of the desired reduction in speed. Numerous disadvantages, including great complexity of construction, expense in manufacture and repair, and relatively low efficiency when compared with the actual longevity of service obtained from such intricate installations, are now experienced, and it is to overcome these and other difficulties that I have produced my present form of multi-stroke engine.

An object of my invention is to produce a multi-stroke engine provided with means including oppositely moving power transmitting devices adapted to receive the relatively high speed power strokes of the pistons and convert them into slow rotary motion.

Another object of my invention is the production of a multi-stroke engine preferably of the opposed piston and internal combustion type, wherein a multiplicity of power strokes is imparted to oppositely associated and reciprocating cam like slides or wedges, for every revolution of the power shaft, the said power shaft of the engine being interconnected with the said cam slides or wedges.

Another object of the invention is to produce a multi-stroke engine provided with power transmitting devices and means whereby the movement of said devices can be varied with relation to the travel or stroke of the piston.

A further object of this invention is the production of a multi-stroke engine of the opposed piston type including means for effecting the relative movement of said opposed pistons whereby a time interval is provided for surcharging the cylinder, and such other variable movements of the pistons obtained for completely exhausting the burnt gases, and producing proper compression.

A still further object of the invention is to produce a multi-stroke engine having power transmitting devices interposed between the pistons and work or crank shaft, and means for relieving any drag or excess friction during the compression stroke in an adjacent cylinder of the engine, due to the interpositioning of said power transmitting devices.

With these and other objects in view the invention further consists in the arrangement and construction of the several parts hereinafter described and pointed out in the appended claims.

In the accompanying drawings an embodiment of my invention is shown together with a few modifications thereof. It will be understood however, that numerous other arrangements and associations of engine elements can be produced, the illustrations herein being presented for purposes of assisting those skilled in the art to become acquainted with a few of the applications of my invention.

Fig. 2 is a similar view illustrating the pistons and associated power transmitting devices in firing position;

Fig. 3 is a transverse sectional elevation showing a series of adjacent cylinders with their pistons in operative relation, and an interconnected friction reducing device associated therewith;

Fig. 4 is a horizontal sectional view on the line 4—4 of Fig. 1;

Fig. 5 is a detail perspective view of the frame section cooperatively associated with the upper piston;

Fig. 6 is a detail perspective view of one of the box or housing sections interconnected with the said frame section and friction reducing device;

Fig. 7 is a detail perspective view of one of the power transmitting members;

Figs. 8, 9, 10 and 11 are views illustrating an application of my invention to a four cycle type of engine;

Fig. 12 is a modified form of engine wherein a plurality of cams or wedges is provided on the power transmitting members for obtaining a relatively large number of power strokes for a single revolution of the power shaft; and Fig. 13 is another modified form showing a particular means for imparting the power from the power transmitting devices to a centrally arranged power shaft.

Figure 1:
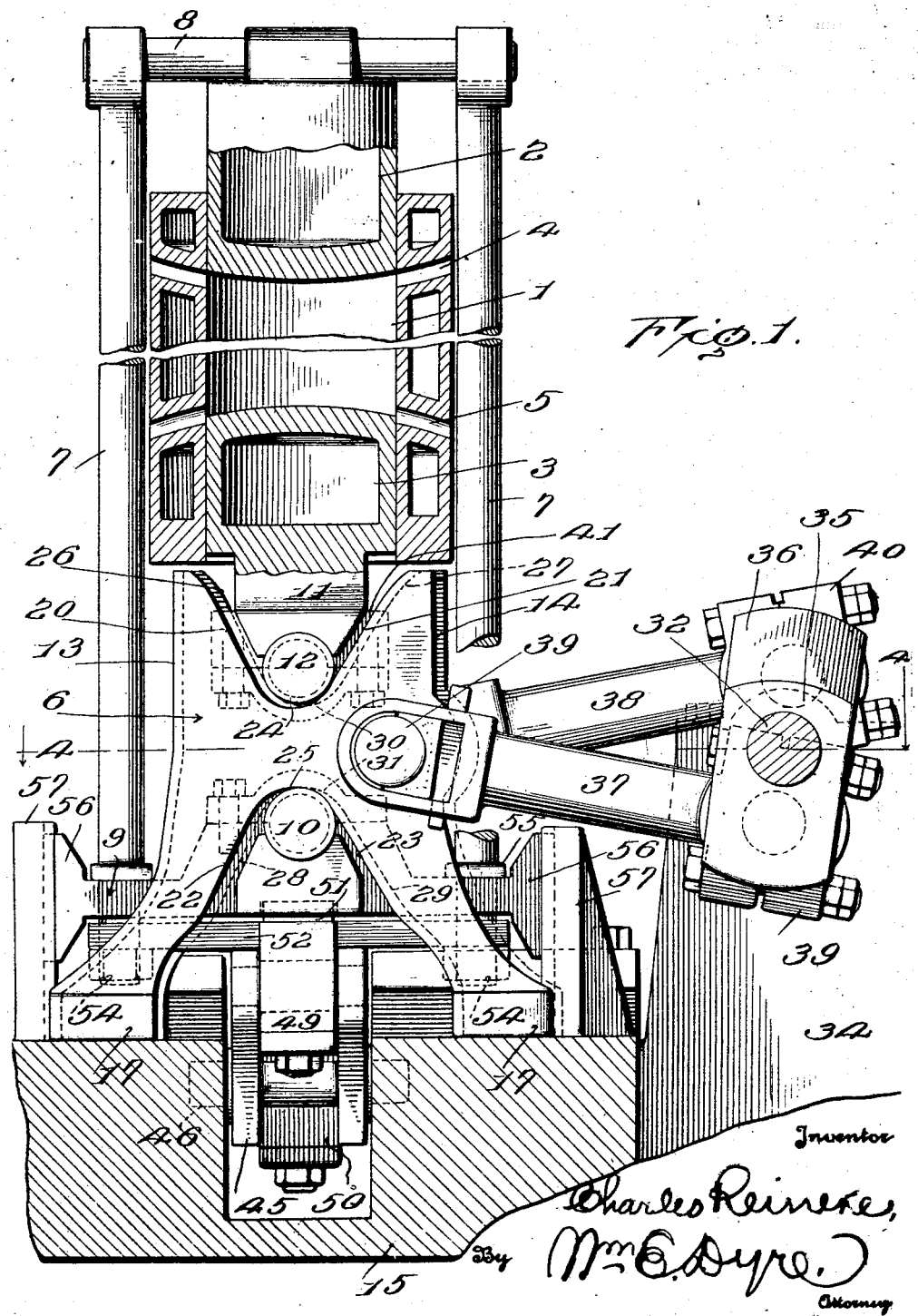
Fig. 1 is a vertical sectional elevation through my engine with the pistons in extreme working position.

The present invention, generally stated, comprises among other things a cylinder having arranged therein a piston, a power transmitting device operated by said piston, and a power shaft connected to said power transmitting device. The power transmitting device preferably consists of oppositely moving cam or wedge like slides between and against which one end of the piston operates. A power or crank shaft is connected to each of the oppositely moving slides and for each revolution thereof, a multiplicity of strokes of the piston is required.

Referring to the drawings wherein similar reference characters designate corresponding parts in the several views, and wherein the several parts are shown in fragmentary or partially diagrammatic relation, without the inclusion of the detail and usual associated engine parts, the cylinder 1 has arranged therein in opposed relation the pistons 2 and 3. In the present disclosure I have shown an internal combustion engine of the opposed piston or "Diesel" type and one more especially designed for marine use, but it will be understood that many other types of engines and other applications thereof may be produced, and I do not limit myself to the showing herein.

Suitable intake ports 4 and exhaust ports 5 are provided in the cylinder, said ports being opened and closed in periodic timed relation by the pistons 2 and 3.

The power transmitting device is generally indicated by the numeral 6, and is operated by the respective opposed pistons 2 and 3, each of said pistons being operably associated with said device as will presently appear. Rods 7 secured to a cross connection 8 provided on the upper piston 2, are attached to a transverse frame section 9 movably associated with the power transmitting device. A roller 10 is provided in the frame section 9 and serves to impart the movement of the piston 2 to the power transmitting device 6. The piston 3 is provided with an extension 11, having mounted therein a similar roller 12 adapted to impart the movement of the said piston 3 to the power transmitting device.

The power transmitting device 6 includes oppositely moving members 13 and 14, mounted for reciprocation upon the base 15 and within the guides 16. Projecting flanges or shoes 17 are formed on said members 13 and 14, the guides 16 being secured to the base by bolts 18, and having extending flanges 19 arranged to house and guide the shoes 17. While I have shown this form of horizontally reciprocatory power transmitting device, it will be understood that various other arrangements of the oppositely moving members may be provided, such for example as arcuate or circularly arranged and oppositely revolving or oscillating members, and in some cases it may be desired to arrange the said members in an angular or vertical position, etc.

The respective members 13 and 14 are slidingly arranged for opposite reciprocation past each other, the cam or angular faces of said members being adapted to receive the power strokes of the piston as imparted through the rollers 10 and 12 hereinbefore referred to. As best shown in Fig. 2, the rollers are movably associated between and against opposite cam faces of the respective members 13 and 14. The pistons 2 and 3 are in firing position in Fig. 2, the rollers being positioned near the outermost face of the cams. In Fig. 1 the pistons are shown in substantially their outermost position after firing, with the rollers operating upon the innermost portions of the cam faces.

Each member 13 and 14 is identical in construction and the cam or wedge like faces of each are of similar contour. The cam faces of the member 13 cooperating with the roller 12 are indicated by the numerals 20 and 21, and the cam faces associated with the roller 10 are indicated by the numerals 22 and 23. An intermediate portion or dwell surface 24 connects the cam faces 20 and 21. The contour of this surface 24 is designed to permit of the proper throw of the interconnected crank, and also may be formed to permit of the desired periodic movement of the piston 3 across the exhaust ports 5. A dwell surface 25 connects the cam faces 22 and 23, said surface being similarly designed and adapted to control the desired periodic movement of the piston 2 across the inlet ports 4.

In the present design of engine these respective dwells 24 and 25 are slightly different so as to provide relative movements of the pistons 2 and 3 across the intake and exhaust ports to permit of the proper discharge of the burnt gases and the surcharging or supplemental injection of air or fuel.

A particularly effective control of the respective pistons can be obtained by the provision of these innermost cam surfaces 24 and 25.

The member 14 of the power transmitting device is provided with the cam faces 26 and 27 adapted to cooperate with the roller 12; and cam faces 28 and 29 arranged to cooperate with the roller 10. An intermediate cam portion or dwell 30 connects the cam faces 26 and 27, the contour of said portion 30 being substantially similar to the cam dwell 24 whereby the opposite faces of said cam portions bear against the roller 12 as indicated in Figs. 1 and 2 and control the movement of the piston 3 at its outermost path of travel, and more particularly while covering and uncovering the exhaust ports 5. In a like manner an intermediate cam portion or dwell 31 connects the cam faces 28 and 29, the contour of said portion 31 being substantially similar to the cam dwell 25 whereby the opposite faces of said cam portions bear against the roller 10 and control the relative movement of the piston 2 at its outermost path of travel when closing and opening the intake ports 4.

The respective cam dwells 24 and 30, and 25 and 31, are of slightly different contour so as to permit of the relative periodic movement of the pistons 2 and 3 across the intake and exhaust ports as hereinbefore mentioned.

Reference being had to Figs. 1 and 2 it will be seen that in operation the roller 12 imparts movement to the members 13 and 14 of the power transmitting device by operating between and against the cam faces 26 and 21 upon one stroke of the piston 3, and between and against the cam faces 20 and 21 upon the succeeding stroke of the piston, the cooperating cam portions or dwells 24 and 30 cooperating as hereinbefore described. The roller 10 similarly imparts movement from the piston 2 by operating between and against the cam faces 28 and 23 upon one stroke of the piston, and between and against the cam faces 22 and 29 upon the succeeding stroke of the piston, the associated cam portions or dwells 25 and 31 cooperating as hereinbefore described.

By this construction it will be obvious that a multiplicity of power strokes of the pistons is required to reciprocate the power transmitting members 13 and 14 to effect a single revolution of the crank or power shaft 32.

The power shaft is preferably mounted adjacent the power transmitting device, and as shown is mounted in suitable bearings 33 provided on uprights 34 extending from the base 15 or otherwise provided. The respective arms 35 and 36 of the crank are interconnected with the members 13 and 14 of the power transmitting device by means of the connecting rods 37 and 38. Suitable cross head connections 39 and 40 are provided upon the respective members 13 and 14 as shown. While I have shown this form of connecting means it will be understood that other forms may be provided for imparting the multiplicity of strokes of the pistons to a power shaft, and I do not limit myself to the exact construction shown.

It will be understood that any number of cylinders may be provided, and the respective crank connections arranged upon the power shaft may be positioned at the appropriate angles for overcoming dead centers and otherwise adding to the distributive efficiency of the power strokes.

In the present construction the roller 12 is retained within the extension 11 provided on the piston 3 by means of a cap bearing 41. A flange or collar portion 42 is formed on the rollers and serves to prevent any lateral movement or the possibility of its dislodgement. The roller 10 is similarly retained by means of the cap bearing 43 and a flange or collar 44 provided on said roller. This construction permits of the free rotation of the rollers 10 and 12 while operating against the cam faces of the power transmitting members, thereby increasing the efficiency of the device and reducing the friction to a minimum.

Additional means for reducing the friction and increasing the efficiency of the engine may be provided whereby the said rollers are moved out of contact with the cam faces during the return stroke of the piston. This mechanism is best illustrated in Fig. 3 and comprises a lever 45 pivotally supported at 46 between adjacent cylinders of the engine. The opposite ends of the lever are attached to block connections 47 and 48 slidingly mounted in boxes 49 and 50. Each box is yieldingly connected to the frame section 9 hereinbefore referred to, by means of a spring 51 interposed in a recess 51'' (see Fig. 3). The spring is of a strength proportionate to the compression obtained within the cylinder, and is slightly weaker than the maximum compression obtained.

Arms 52 extend from the box and are designed to receive the lowermost ends of the rods 7 which latter pass through the projecting arms 53 of the frame section 9. Nuts 54 are threaded upon the ends of the rods, and these together with collars 55 serve to limit the extent of the movement provided for between the section 9 and box connection.

The effect of this construction is to permit of the relative yielding of the frame section 9 as controlled by the action of the spring and the compression in the adjacent cylinder whereby the roller 10 is moved out of contact with the cam face with which it cooperates during its return or inoperative position. Suitable shoes 56 operable in the guide 57 may be provided for the frame section 9.

While I have shown this friction reducing means as applied to the lower roller 10 only, it will be understood that a similar device may be associated with the roller 12.

In operation, the fuel charge may be admitted in any well known manner and fired in the usual way according to the type of engine and ignition desired, whereupon the pistons 2 and 3 are moved to their outermost paths of travel in opposite directions as will be understood. As the piston 3 moves downwardly the roller 12 operating between the opposite cam faces of the respective power transmitting members 13 and 14, moves the said members in opposite directions and transmits this reciprocatory movement through the connecting rods 37 and 38 to the respective crank arms 35 and 36 for revolving the crank or power shaft 32.

The roller 10 operates similarly between its opposite cooperating cam faces as it moves upwardly, and transmits motion from the piston 2 to the members 13 and 14 interconnected with the power shaft as aforesaid. The relative movement of the rollers 10 and 12 at their innermost points of travel upon the connecting cam portions or dwells permits of the exhaust, surcharging and intake as hereinbefore described.

In the form of engine just described two complete strokes of the pistons 2 and 3 are required to rotate the crank shaft a single revolution, and it will be obvious that the reciprocating power transmitting device evenly receives the relatively high speed power strokes of the piston and converts them into slow rotary motion.

The foregoing operation comprises generally a two cycle engine, but it will be apparent that other cycles of operation may be provided, Figs. 8 to 11 inclusive illustrating the several positions of a four cycle engine.

In this type of engine the cylinder 60 is provided with opposed pistons 61 and 62. An intake valve is shown at 63 and an exhaust valve at 64. The respective rollers for each piston are indicated at 65 and 66. The power transmitting members 67 and 68 reciprocate oppositely as in the form of engine hereinbefore described, but the opposite cam faces of each member are varied whereby the path of travel of the pistons changes with the respective exhaust and compression strokes.

As shown in Fig. 8 the charge has just been fired the roller 65 operating against and between the cam face 69 of the member 67 and cam face 70 of the member 68; and the lower roller 66 operating between the cam face 71 of the member 67 and cam face 72 of the member 68. The next cycle of the engine is illustrated in Fig. 9 wherein the pistons 61 and 62 have been moved toward each other, whereby the entire accumulation of burnt gases from the previous firing cycle is forced through the exhaust valve 64 shown in said figure in open position. It will be understood that the valves are controlled in any suitable timed relation.

The pistons are moved to the extreme innermost position by the opposite cam faces of the power transmitting members being of a slightly different contour. As shown the opposite cam face 73 of the member 67 and the opposite cam face 74 of the member 68 cooperate with the roller 65; and the cam face 75 of the member 67 and the cam face 76 of the member 68 cooperate with the roller 66. The relative differences in the contours of the respective cam faces 69, 73 and 71 and 75 of the power transmitting member 67; together with the corresponding differences in the contours of the respective opposite cam faces 70, 74 and 72—76 provide for this differential reciprocation of the pistons 61 and 62 as will be understood.

The pistons in Fig. 10 indicate an extreme outermost or intake position wherein the rollers have been moved down their respective cam faces for the third cycle. The compression cycle is illustrated in Fig. 11, the respective cam faces of the members 67 and 68 cooperating to move the pistons to an innermost position constituting a relative short path of travel as compared with the exhausting cycle.

From this construction it will be seen that the path of travel or stroke of each piston or series of opposed pistons can be varied for succeeding cycles of the engine.

In the form of power transmitting device illustrated in Fig. 12 the members 80 and 81 are provided with a series of projecting cams or wedges 82 and 83 with which the rollers 84 and 85 of the opposed pistons cooperate. The successive movements of the piston rollers between these series of adjacent cam surfaces provides for a relatively large number of power strokes of the piston for every revolution of the crank shaft indicated by the numeral 86. A sliding connection 87 may be provided for maintaining adjacent pistons against the cam projections. The rollers 84 and 85 are also slidably associated with the block members 88 and 89 to permit of their moving over the high points of said cams and against the adjacent and cooperating cam surfaces.

A modified form of means for imparting power from the transmitting members to the crank or power shaft is shown in Fig. 13. The two series of opposed pistons are designed to fire in unison whereby the power transmitting members 90 and 91 are oppositely moved or reciprocated as will be understood. Each power transmitting member in addition to the cam faces shown, is provided with an opening 92 having a relatively straight side 93 and a curved or semi-circular portion 94. Roller shafts 95 are designed to operate against these respective surfaces 93 and 94, and as the members 90 and 91 are oppositely reciprocated motion is imparted to the roller shafts revolubly associated with the power shaft 96. A block 97 supports the roller shafts and power shaft, said power shaft being mounted in suitable bearings as will be understood.

Other cylinders and pistons may be associated with the power shaft as will be understood.

By this construction a relative compact and simple engine is provided for automobile and similar use.

My present type of engine including the direct transmission of relatively high speed power strokes of the pistons to a slower moving power shaft, is particularly adapted for marine use, although it will be obvious that many other applications or installations of a stationary and mobile character can be produced with equally efficient results. Steam, compressed air, oil, gasoline, gas, and other power mediums may be used, and my present invention is also applicable to these and other kinds and types of engines.

I claim:

1. In an engine, the combination with a cylinder of a relatively high speed piston arranged therein, a slow speed power shaft, and means including oppositely moving power transmitting cam devices interconnecting the piston and power shaft whereby a multiplicity of power strokes of said piston is imparted to the power shaft for every revolution thereof.

2. In an engine the combination with a cylinder of a relatively high speed piston arranged therein, a slow speed power shaft, and means including reciprocating power transmitting cam devices interconnecting the piston and power shaft, whereby a multiplicity of power strokes of the piston is imparted to the power shaft for every revolution thereof.

3. In an engine the combination with a cylinder of a relatively high speed piston arranged therein, a slow speed power shaft, and means including oppositely reciprocating power transmitting devices interconnecting the piston and power shaft whereby a multiplicity of strokes of the piston is imparted to the power shaft for every revolution thereof.

4. In an engine the combination with a cylinder of a relatively high speed piston arranged therein, a slow speed power shaft provided with a crank, a power transmitting and reciprocating slide cam device operated by said piston, and means connecting said slide device and crank whereby a multiplicity of power strokes of the piston is imparted to the power shaft for every revolution thereof.

5. In an engine the combination with a cylinder of a relatively high speed piston arranged therein, a slow speed power shaft provided with a crank, oppositely moving power transmitting devices operated by said piston, and means connecting each of said power transmitting devices to the crank, whereby a multiplicity of strokes of the piston is imparted to the power shaft for every revolution thereof.

6. In an engine the combination with a cylinder of a relatively high speed piston arranged therein, a slow speed power shaft, a reciprocating power transmitting device having a cam face against which the piston operates, and means connecting the power transmitting device to the power shaft, whereby a multiplicity of power strokes of the piston is imparted to the said power shaft for every revolution thereof.

7. In an engine the combination with a cylinder of a relatively high speed piston arranged therein, a slow speed power shaft, oppositely moving power transmitting devices each provided with cooperating cam faces against and between which the piston operates, and means connecting the power transmitting devices to the power shaft whereby a multiplicity of strokes of the piston is imparted to the power shaft for every revolution thereof.

8. In an engine the combination with a cylinder of a relatively high speed piston arranged therein, a slow speed power shaft, a reciprocating power transmitting device having a cam face, and means carried by said piston and adapted to operate against said cam face for moving the power transmitting device whereby a multiplicity of power strokes of the piston is imparted to the power shaft for every revolution thereof.

9. In an engine the combination with a cylinder of a relatively high speed piston arranged therein, a slow speed power shaft, a reciprocating power transmitting device having a cam face, and means including a roller on said piston adapted to bear against and roll upon the said cam face for moving the power transmitting device, whereby a multiplicity of power strokes of the piston is imparted to the power shaft for every revolution thereof.

10. In an engine the combination with a cylinder of opposed pistons arranged therein, a power shaft of relative slow speed, and means including oppositely reciprocating power transmitting devices adapted to be operated by the respective opposed pistons for imparting a multiplicity of power strokes to the aforesaid shaft for every revolution thereof.

11. In an engine the combination with a cylinder of opposed pistons arranged therein, a power shaft of relative slow speed provided with a crank, oppositely moving power transmitting cam devices adapted to be operated by the respective opposed pistons, and means connecting said power transmitting devices with the aforesaid crank whereby a multiplicity of strokes of the pistons is imparted to the power shaft for every revolution thereof.

12. In an engine the combination with a cylinder of opposed pistons aranged therein, a power shaft of relative slow speed, and means including oppositely reciprocating power transmitting devices provided with cooperating cam faces between and against which the respective pistons operate whereby a multiplicity of strokes of the pistons is imparted to the aforesaid shaft for every revolution thereof.

13. In an engine the combination with a cylinder of opposed pistons arranged therein, a power shaft, oppositely reciprocating power transmitting devices respectively operated by the opposed pistons, means including reciprocating cam faces for producing different length strokes respectively of said opposed pistons, and means connecting the said power transmitting devices to the power shaft.

14. In an engine the combination with a cylinder of opposed pistons arranged therein, a power shaft, oppositely reciprocating power transmitting devices respectively operated by the opposed pistons, cooperating cam faces provided on said power transmitting devices against which the piston operate, said cam faces being arranged in opposite V-like formation, and means including the aforesaid cam faces for determining the stroke of said opposed pistons with relation to each other and means connecting the power transmitting devices to the power shaft.

15. In an internal combustion engine, the combination with a cylinder having intake and exhaust ports, of opposed pistons arranged therein, a power shaft, a reciprocating power transmitting device operated by said pistons, means including cam faces provided on said power transmitting device for determining the time interval of the respective pistons during which the respective intake and exhaust ports are opened and closed with relation to each other, and means connecting the said power transmitting device to the power shaft.

16. In an internal combustion engine, the combination with a cylinder having intake and exhaust ports, of opposed pistons arranged therein, a power shaft, oppositely moving power transmitting devices operated by said pistons, means carried by said power transmitting device for determining the relative movements of said opposed pistons across the aforesaid intake and exhaust ports, and means connecting the said power transmitting devices to the power shaft.

In testimony whereof I affix my signature, in presence of two subscribing witnesses.

CHARLES REINEKE.

Witnesses:
  G. M. POPE,
  R. L. LAKE.